(12) United States Patent
Basiri (10) Patent No.: US 12,014,618 B2
(45) Date of Patent: Jun. 18, 2024

(54) WEARABLE REMINDER FOR DRINKING

(71) Applicant: Salar Basiri, Tehran (IR)

(72) Inventor: Salar Basiri, Tehran (IR)

(73) Assignee: Salar Basiri, Tehran (IR)

( * ) Notice: Subject to any disclaimer, the term of this patent is extended or adjusted under 35 U.S.C. 154(b) by 0 days.

(21) Appl. No.: 18/052,920

(22) Filed: Nov. 6, 2022

(65) Prior Publication Data

US 2024/0153373 A1 May 9, 2024

(51) Int. Cl.
*G08B 21/24* (2006.01)
*G06K 7/10* (2006.01)

(52) U.S. Cl.
CPC .......... *G08B 21/24* (2013.01); *G06K 7/10297* (2013.01); *G06K 2007/10534* (2013.01)

(58) Field of Classification Search
CPC ............... G08B 21/24; G06K 7/10297; G06K 19/0723; G06K 7/10396
USPC ....................................................... 235/451
See application file for complete search history.

(56) References Cited

U.S. PATENT DOCUMENTS

| | | | |
|---|---|---|---|
| 9,334,150 B1* | 5/2016 | Ost ...................... | B67D 1/0888 |
| 2008/0303638 A1* | 12/2008 | Nguyen ................. | G06Q 10/00 |
| | | | 707/E17.014 |
| 2009/0294521 A1* | 12/2009 | de la Huerga .......... | A61J 1/035 |
| | | | 235/375 |
| 2014/0340229 A1* | 11/2014 | Wu ........................ | G16H 10/60 |
| | | | 340/603 |
| 2015/0095168 A1* | 4/2015 | Zises ...................... | G06Q 50/12 |
| | | | 705/15 |
| 2019/0290392 A1* | 9/2019 | Hansen .................. | A61B 90/98 |

\* cited by examiner

*Primary Examiner* — Ahshik Kim (57) ABSTRACT

The present disclosure generally relates to drink reminder, and more particularly, to a wearable reminder for drinking in a bracelet or a finger ring form factor. One of issues that cause illness in elderly or persons with special illness or ordinary persons due to improper habit, is frequently they forget to drink enough amounts of liquid and this inadequate drink lead to dehydration. Using special drinkware which comprises bulky circuits and batteries is not convenient for users and people like to use their own personal drinkware, mug, cup or glass. This disclosure proposes a wearable reminder for drinking and can be used with any kind of drinkwares and only need to attach an active, passive or semi-active RFID tag to the drinkware. The user wears a wearable like bracelet or a finger ring and wearable reminds him/her based on predefined time schedule or condition.

2 Claims, 6 Drawing Sheets

WEARABLE REMINDER FOR DRINKING

RELATED APPLICATION

The present USPTO application claims priority from PCT International Application No. PCT/162020/060499, filing date Nov. 8, 2020, Publication No. WO/2021/059259, Publication Date Apr. 1, 2021, entitled "Wearable Reminder for Drinking", which is incorporated by reference herein in its entirety.

TECHNICAL FIELD

The present disclosure generally relates to drink reminder, and more particularly, to a wearable reminder for drinking in a bracelet or a finger ring form factor.

BACKGROUND ART

One of issues that causes illness in elderly or persons with special illness or ordinary persons due to improper habit, is frequently they forget to drink enough amounts of liquid and this inadequate drink lead to dehydration. Dehydration can cause serious problems in illnesses like stroke, Alzheimer, kidney diseases, etc. Using special drinkware that comprises bulky circuits and batteries in a special drinkware form factor is not convenient for users and people like to use their own personal drinkware or mug or cup or glass.

U.S. Pat. No. 9,558,646 to Huang et al discloses a prompt circuit in a drinking cup includes a processor, temperature sensing and weight sensing units, and a prompt unit. The temperature sensing unit displays to a user the temperature of the liquid. The weight sensing unit detects a weight of liquid in the cup, and transmits the weight to the processor. The prompt unit includes a communication unit and a speaker unit. When any change of the weight of liquid in the cup within a first preset time is less than a preset value, the processor outputs a first control signal, to control the speaker unit to output an alarm. When the weight of liquid in the cup in unchanged for a preset time period after the speaker unit has output the alarm, the processor outputs a second control signal to the communication unit and the communication unit outputs a reminding message to a user.

U.S. Pat. No. 9,230,423 to Wu et al discloses a drinking reminder method implemented by an electronic apparatus. The apparatus includes a scale pan, a weight sensor, an analog/digital (A/D) converter, a display screen and a keypad. The keypad includes a power key, a reset key and a switching key. The weight sensor senses an analog pressure signal when a cup filled with water is placed on the scale pan, and the A/D converter converts the analog pressure signal to a digital weight signal. A total weight of the cup filled with water is measured according to the digital weight signal, and a cumulative water intake volume and a water shortage volume of a user. The display screen displays the cumulative water intake volume and the water shortage volume to remind the user to drink water.

U.S. Pat. No. 9,740,824 to Chang et al discloses a drinking water reminding system and the reminding method thereof. The water intake of user is measured by the operation of a reminder of the drinking water reminding system, and a collector of the drinking water reminding system is provided for adjusting the daily drinking water demand of user according to environmental parameters or the physiological parameters of user. The drinking water reminding system reminds the user to drink water if the drinking water reminding system determines that the user has taken insufficient water according to predetermined conditions and measurement results, drinking water reminding system.

U.S. Pat. No. 10,664,571 to Wernow et al discloses a communicative water bottle includes communication logic and wireless transmission logic technology electronically connected with a variety of sensors either on the water bottle or located remote from the water bottle. The sensors on the bottle create digital data associated with amount of fluid in the bottle and change thereof. The sensors remote from the bottle, which can be on an activity tracker, create digital data associated with an activity being performed by a user, such as running, or the absence of activity, such as remaining sedentary. A display on the bottle can indicate to the user the amount of fluid consumed or a reminder that fluid should be consumed. The fluid consumption data syncs with other remote devices such as mobile applications executable on smart phones.

Despite these and other improvement in the art, still further improvements are necessary in the field of drink reminders.

SUMMARY OF THE INVENTION

This summary is intended to provide an overview of the subject matter of this invention, and is not intended to identify essential elements or key elements of the subject matter, nor is intended to be used to determine the scope of the claimed implementations. The proper scope of this patent may be ascertained from the claims set forth below in view of the detailed description below and the drawings.

In accordance with certain preferred embodiment of present invention, this disclosure proposes wearable reminder for drinking and can be used with any ordinary kind of a drinkware, mug, cup, glass, etc. Present invention only needs to attach an active, passive or semi-active Radio-Frequency Identification RFID tag to desired drinkware. User of this invention wears a bracelet or a finger ring that reminds him/her based on predefined time schedule and condition. The wearable reminder for drinking comprises an electronic bracelet or a finger ring with short range wireless radio communication ability to or from an active, passive or semi-active RFID tag. The tag is attached to the drinkware, the mug, the cup, the glass, etc. The wearable reminder comprises a microcontroller or a timer circuit to generate audio, visual or vibration alarm to remind the user to drink enough liquid. The wearable reminder further comprises an accelerometer, a gyroscope and an electronic compass to track user hand movement when bracelet is near the drinkware. The RFID tag is attached to the drinkware or the mug or the cup or the glass, so the bracelet or the finger ring can detect the user are drinking or not, by checking the RFID tag is detected and readable or not, and so can determine how many times and how much he/she drinks. The wearable comprises the microcontroller or the timer circuit, and based on predefined time schedule or condition, that doesn't affect user sleeping time, and also based on user needs for drink based on age, illness, etc, generates audio, visual or vibration alarm to remind user to drink. The wearable, further, comprises impedance meter circuit and probe to measure skin impedance and detect lack of moisture in skin due to lack of drink and dehydration. After generating drink alarm, the user goes to drink and take the drinkware by hand, then the bracelet or the finger ring with the help of the RFID tag attached to the drinkware and identification signal from RFID reader circuit inside the bracelet or the finger ring, detects that the user has taken the drinkware in his/her hand and is drinking. So, the wearable detects and counts how many times and how much the user drinks. As said before the bracelet or the finger ring comprises accelerometer, gyroscope and electronic compass, so can detect and analyze the user's hand movement and calculate how much he/she drinks and find amount of liquid that has drunk by the user in each drinking session, So can reschedule next drinking session based on gathered data.

In a preferred aspect, the present disclosure is directed to a wearable reminder for drinking. The exemplary wearable reminder for drinking can comprise: an RFID tag (12), the RFID tag is a tag selected from the group consisting of active RFID tag, passive RFID tag or semi-active RFID tag, the RFID tag (12) is attached to a drinkware (10); and a bracelet (20), the bracelet can comprise a RFID tag reader circuit (54) for said RFID tag, a microcontroller (53), a means for audio (56), visual (57), or vibration alarm (58), activated by the microcontroller (53) and deactivated by the microcontroller based on RFID detection signal from said RFID tag reader circuit (54), and an electric power storage (59). The bracelet (20) further can comprise a means for movement detection selected from the group consisting of accelerometer sensor, gyroscope sensor (50) or electronic compass sensor (51); and a wireless communication circuit (61). The bracelet (20) further can comprise an impedance sensor (52), wherein the impedance sensor comprises an impedance meter circuit; and an impedance probe.

In one another aspect, the present disclosure is further directed to a wearable reminder for drinking. The exemplary wearable reminder for drinking can comprise: an RFID tag (12), the RFID tag is a tag selected from the group consisting of active RFID tag, passive RFD tag or semi-active RFID tag, the RFID tag (12) is attached to a drinkware (10); and a finger ring (74), the finger ring can comprise a RFID tag reader circuit (54) for said RFID tag, a microcontroller (53), a means for audio (56), visual (57), or vibration alarm (58), activated by the microcontroller (53) and deactivated by the microcontroller based on a RFID detection signal from said RFID tag reader circuit (54), and an electric power storage (59). The finger ring (74) further can comprise a means for movement detection selected from the group consisting of accelerometer sensor, gyroscope sensor (50) or electronic compass sensor (51); and a wireless communication circuit (61). The finger ring (74) further can comprise an impedance sensor (52), wherein the impedance sensor comprises an impedance meter circuit; and an impedance probe.

In a yet another aspect, the disclosure is further directed to a wearable reminder for drinking. The exemplary method according to the present disclosure can comprise: providing an RFID tag (12) attached to a drinkware (10), the RFID tag is a tag selected from the group consisting of active RFID, passive RFID or semi-active RFID; providing an electronic wearable wherein the electronic wearable is a wearable selected from the group consisting of bracelet (20) or finger ring (74), the wearable can comprise an said RFID tag reader circuit (54), a microcontroller (53), audio (56), visual (57), or vibration alarm (58), activated by the microcontroller and deactivated by the microcontroller based on a RFID detection signal from the RFID tag reader, and an electric power storage (59); generating alarm by the wearable, the bracelet (20) or the finger ring (74), based on predefined time schedule and condition; detecting the RFID tag (12) by means of the RFID reader circuit inside the wearable (54); and deactivating alarm and count RFID tag detection as drinking session. The method further can comprise: providing a movement detection sensor inside said wearable, the sensor is selected from the group consisting of accelerometer sensor, gyroscope sensor (50) or electronic compass (51); processing signals of said sensors to detect user hand movement (44); analyzing user hand movement (44) to calculate how many times and how much the user drinks; comparing drink amount to a predefined value; and rescheduling for next drink session based on predefined values.

In the Drawings, identical reference numbers identify same elements. The size and shape and relative position of elements are not necessarily drawn to scale. Further, the particular shapes of the elements as drawn, are not exactly as the actual shape of particular elements and are schematic and have been selected for ease of recognition in the drawings. The drawing figures depict one or more implementations in accord with the present teachings, by way of example only, not by way of limitation.

BRIEF DESCRIPTION OF DRAWINGS

In the Drawings, identical reference numbers identify same elements. The size and shape and relative position of elements are not necessarily drawn to scale. Further, the particular shapes of the elements as drawn, are not exactly as the actual shape of particular elements and are schematic and have been selected for ease of recognition in the drawings. The drawing figures depict one or more implementations in accord with the present teachings, by way of example only, not by way of limitation.

DETAILED DESCRIPTION OF THE INVENTION

In the following description, certain specific details are set forth in order to provide a comprehensive understanding of various implementation of this disclosed invention. A skilled person in relevant art could realize an embodiment of this invention may be practiced with parts of these specific details, or with other methods, circuits, components, materials, etc. In other instance, well-known structures associated with electronic systems, communication networks, or details of circuit design have not been shown or described in detail to avoid unnecessarily obscuring descriptions of implementation and the focus of this disclosure is on core inventive concept of the invention.

The word "comprising" is synonymous with "including", throughout the specification and claims, unless the context requires otherwise, and is inclusive or open ended (i.e. doesn't exclude additional, unrecited elements or method acts). The phrases "in one embodiment" or "in an embodiment" throughout this specification are not necessarily all referring to the same embodiment, and means a particular feature, structure or characteristics, and may be combined in any suitable manner in one or more embodiment of the invention. In this specification and claims, the singular forms "a", "an", and "the" further include plural referents unless the context dictates otherwise. It also important to be noted that the term "or" is employed in its sense including "and/or" unless context dictates otherwise. The term "or" in this disclosure means electronic logical "OR" definition which any operant be true then result is true.

Figure 1:
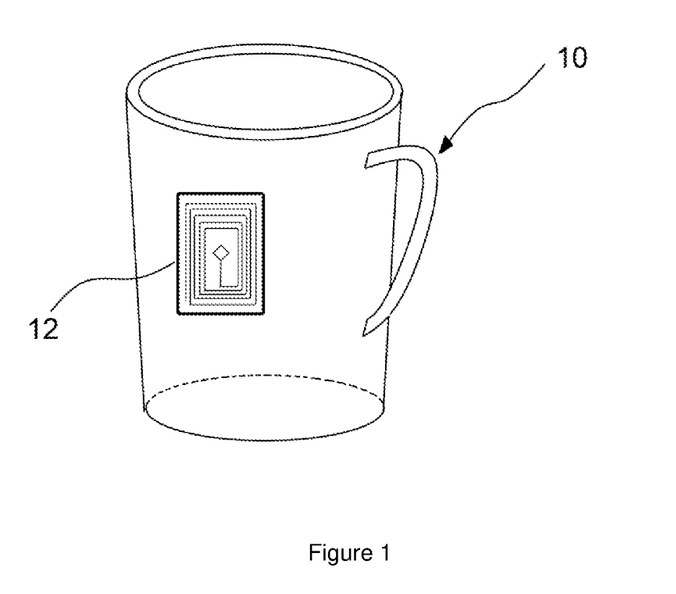
FIG. 1 shows an active and/or passive and/or semi-active RFID tag attached to a drinkware, a mug, a cup or a glass.

In a part of exemplary embodiment of the invention, FIG. 1 is a pictorial diagram of an active, passive or semi-active RFID tag (12) attached to a drinkware (10) for instance, a mug, a cup or a glass. Simplicity of attaching the RFID tag to a user's desired drinkware, cause ease and convenient use of the subject matter of present invention and it is only necessary to attach the RFID tag (12) to any kind of desired drinkware (10) to be able to utilize this invention subject matter. The RFID tag may be active or passive or semi-active. For instance, the passive type may comprise but not limited to any 125 KHz, 13.56 MHz or UHF RFID tag, and the active type comprises simple components like a SMD crystal oscillator connected to a tuned LC tank circuit and antenna, a micro power microcontroller like ATTiny13, and a coin cell battery or wrist watch battery.

Figure 2:
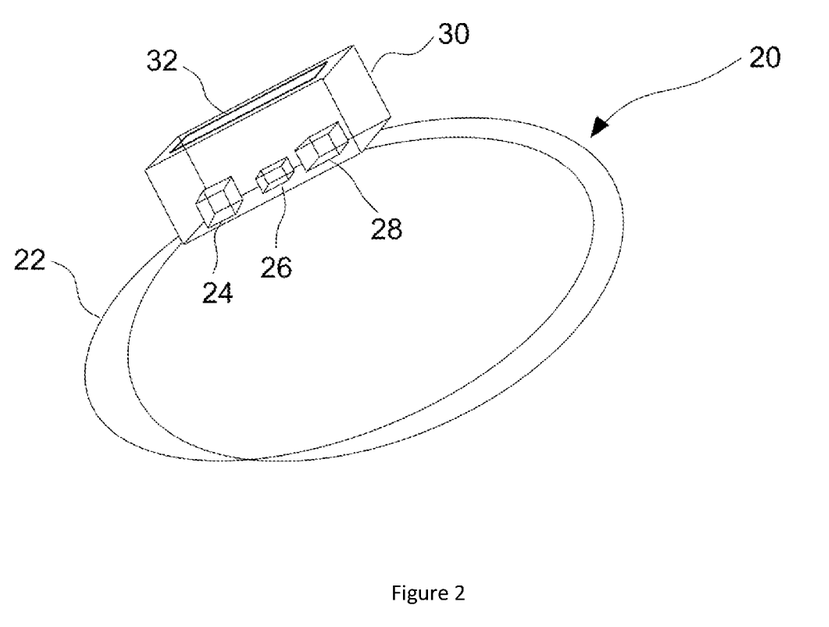
FIG. 2 shows first exemplary embodiment of this invention, a bracelet which comprises required circuits and means for propose of this invention.

In an exemplary embodiment of disclosed Invention, FIG. 2 is a pictorial diagram of an electronic bracelet (20) which is worn on user's wrist. Inside band of the bracelet, may comprise passive RFID tag transmitter and receiver inductor coil (22). Electronic circuit and components are embedded in the bracelet case (30) and attached to the bracelet band. They comprise but not limited to a battery (28), RFID tag reader-driver circuit, accelerometer, gyroscope, electronic compass sensor and a microcontroller or timer circuit (26), display (32), and audio or visual or vibration alarm (24).

Figure 3:
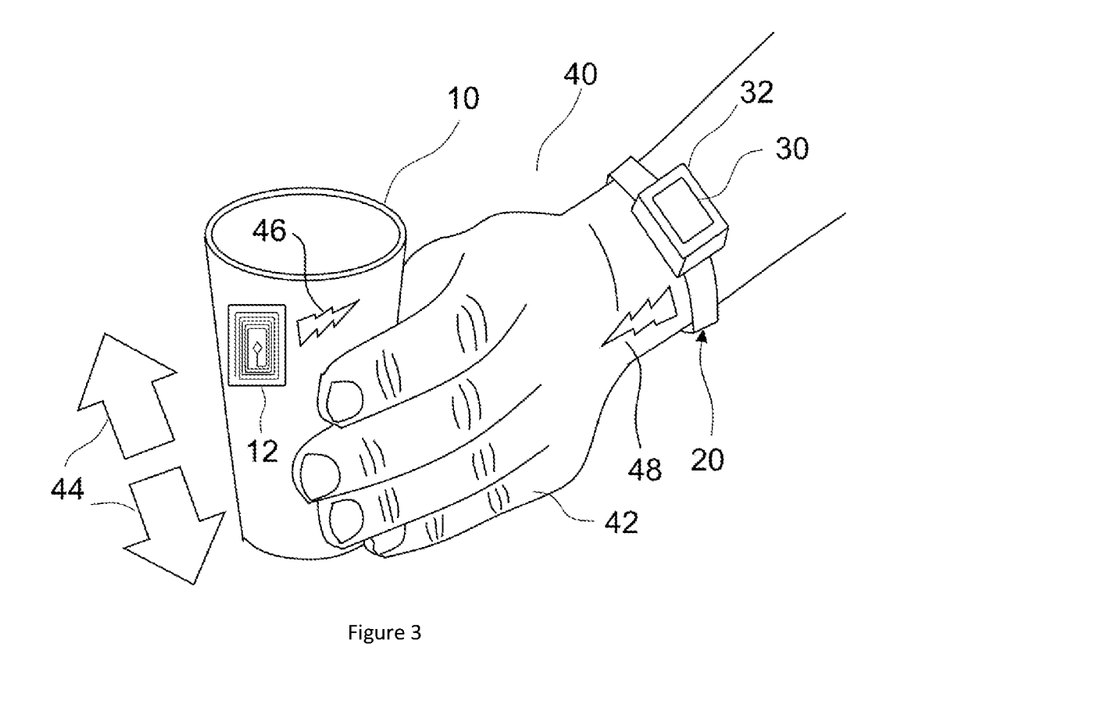
FIG. 3 shows a bracelet which is wore on user wrist and depicts how this invention works.

An exemplary embodiment of a wearable reminder for drinking is illustrated in FIG. 3. The user (10) holds a drinkware (42), for instance a mug, by hand. The RFID reader-driver inside the bracelet (20) and bracelet case (32) connects and read the RFID tag (12), based on type of the tag, by means of magnetic or electromagnetic activation and transmission, or RF hand shaking and data transmission, where the tag is in proper distance range from bracelet (48), (46). In case of implementing active or semi-active RFID tag, there is no need for magnetic activation-transmission coil inside the bracelet band and a handshaking or simply detecting presence of specified RF wave by means of a simple tuned heterodyne RF receiver is enough to detect the RFID tag is near the bracelet or not. The RFID tag attached to the drinkware transmit its presence or its identification number to the bracelet, so the bracelet detects whether the user is holding the drinkware or the mug or the cup or the glass or not. When the user is doing act of drinking, position or rotation of wrist (40) of his/her hand detects by data gathered by electronic accelerometer, gyroscope or compass inside the bracelet. This data are analyzed and bracelet finds how much the user has drunk and then saves data and use for next time drinking session rescheduling or sends data. The bracelet, further, comprises a mean for audio or visual or vibration alarm, and generates proper reminder alarm based on predefined time schedule or condition. The bracelet also can comprise a mean for skin impedance measurement, so can generate alarm reminder based on impedance of skin which reflects lack of moisture due to lack of drink and liquid in the user body.

Figure 4:
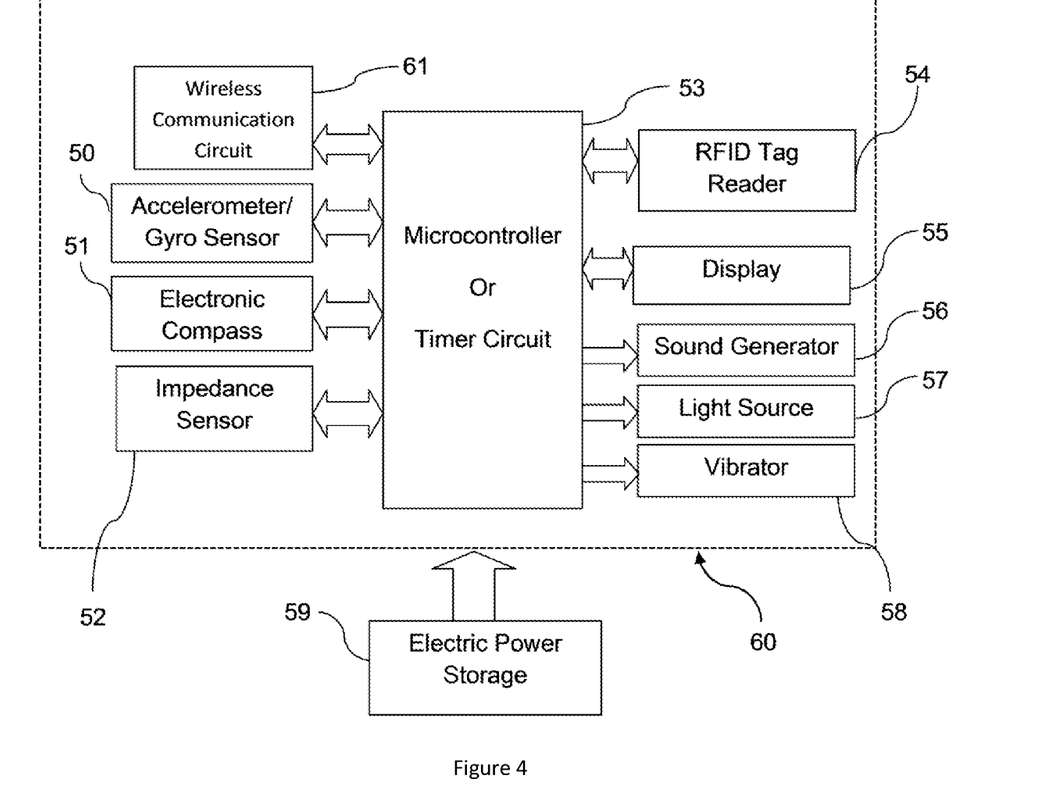
FIG. 4 shows block diagram of units and circuit and components inside a bracelet or a finger ring, and depicts required units for propose of this invention.

A block diagram of an exemplary embodiment of a wearable reminder for drinking in bracelet or finger ring form factor is depicted in FIG. 4. The block diagram is shown main recommended components and circuit in an exemplary embodiment of this invention, and in an implementation of subject matter of the invention all or some or another components and circuit could be implemented by a person with ordinary skills in the art. So, the subject matter of the invention comprises these components and circuit but not limited to. The invention comprises a microcontroller (53) to schedule for reminder and alarm to drink liquid and manage other units shown in block diagram. In bracelet embodiment, for instance, a low power high performance microcontroller like ATXMEGA32, and in finger ring embodiment, for instance, a small form factor microcontroller like ATTINY13 could be implemented. In a very simple implementation of the subject matter a 555 timer IC could be implemented instead of the microcontroller, which reset by a signal from RFID reader and generate alarm when output is activated. Recognition that the bracelet or the finger ring is near the drinkware or not, is based on reading the active or passive or semi-active RFID tag and this detection is done by the RFID reader unit (54). It is possible for a person with ordinary skill in the art to select various components and circuit designs for RFID reader unit. For instance, in an exemplary embodiment of the invention by passive RFID tag and the bracelet form factor, RC522 RFID reader chipset is possible to be implemented. Inductor coil for passive RFID reader can be embedded inside the band of the bracelet. In another exemplary embodiment of the invention, in the finger ring form factor, because of small space inside the finger ring, active or semi-active RFID tag is recommended. For instance, active RFID tag can comprise an SMD crystal oscillator, a small and low power microcontroller like ATTINY13, an LC tuned tank circuit and a small antenna, and a battery. A Heterodyne RF receiver can be implemented for RFID reader in the finger ring form factor. There are so many other circuit designs for RFID reader, which can be implemented by a person with ordinary skills in the art. The bracelet or finger ring can comprise a display (55). Alarm reminder can be generated by an audio generator (56), for instance a speaker or a piezoelectric, a light generator (57), for instance an LED, or a vibrator (58). This alarm reminder works based on predefined schedule or based on impedance measured by impedance circuit (52). The bracelet or the finger ring, further can comprise a skin impedance measurement unit (52), and when the user has lack of liquid and dehydration occurs, detects changes in skin impedance and generate alarm signal to remind user to drink enough liquid. The bracelet or the finger ring further can comprise movement sensors, comprising accelerometer or gyroscope (50), for instance MPU6050, or electronic compass (51), for instance HMC5883. So the wearable is able to analyze user hand movement (44), as shown in FIG. 3, and determine and find how much he/she has drunk, and saves or sends data or reschedules next drinking session. The bracelet or the finger ring can comprise a wireless communication circuit or unit (61), to be able to receive time schedule for drink and other preferred setting and send user usage or statistics or alarm to a mobile phone or computer or another desired device with wireless communication ability. The electrical energy for the circuit of the bracelet or the finger ring is supplied by electric power storage (59), for instance battery or super capacitor.

Figure 5:
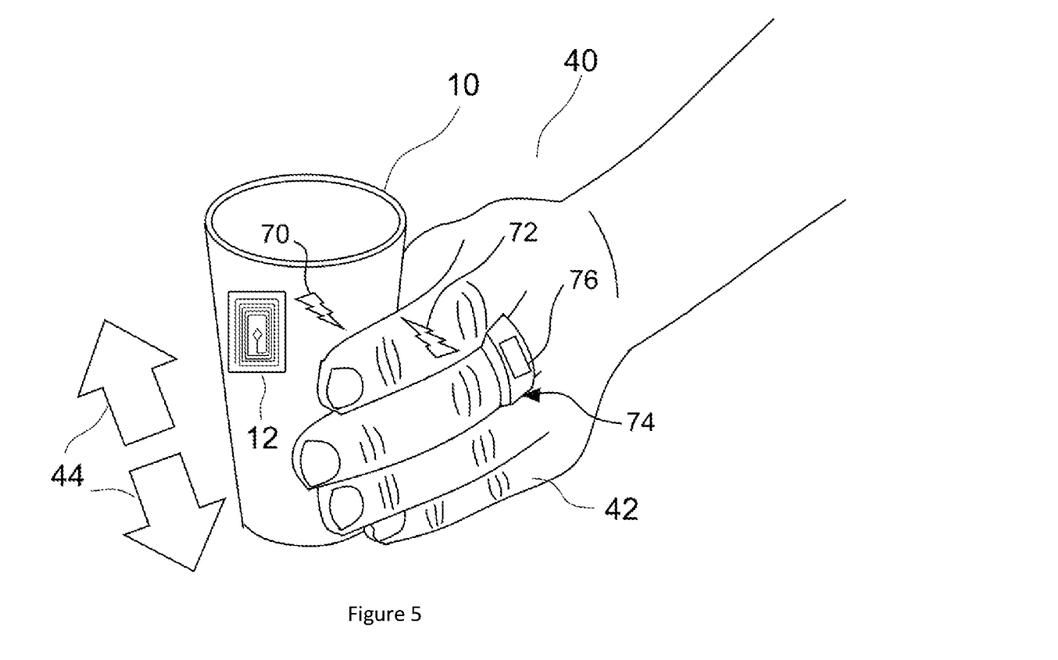
FIG. 5 shows a finger ring which is wore on user finger and depicts another embodiment of how this invention works.

One another embodiment of this invention subject matter in finger ring form factor is shown in FIG. 5. In this implementation user (40) wears the finger ring (74) in one of his/her fingers (42). The electronic circuits, components and units are embedded inside the finger ring (74). Display or an LED (76) can act as alarm reminder, also. Further other kind of said alarms is also possible in desired implementation of the invention subject matter. As said before, using active or semi-active type RFID tag is preferred in finger ring embodiment of the invention, because RFID reader circuit will be simple and compact. Handshaking is done by means of RF signals. The RFID tag (12) sends its identification number (70) and finger ring receive (72), then the finger ring is able to detect the user (40) is handling and utilizing the drinkware (10). Also, user's hand movement (44) is analysed by movement sensors and the finger ring find how many times and how much he/she has drunk, as said in bracelet embodiment of the invention.

Figure 6:
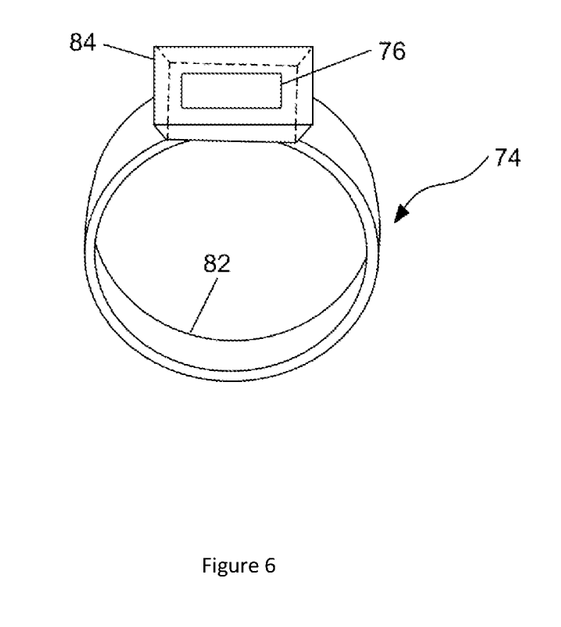
FIG. 6 shows second exemplary embodiment of this invention, a finger ring which comprises required circuits and means for propose of this invention.

The embodiment in the finger ring form factor (74) of this invention subject matter is shown in FIG. 6. Some parts of electronic circuits and components can be embedded inside finger ring case (84) and other parts can be embedded inside finger ring body (82). Display or visual alarm reminder (76) can be placed on the top of the case (84) of the finger ring.

The detailed description has set forth various implementations of the method and device by means of block diagram, schematic, and example. One skilled in the art understand that each operation and function proposed in block diagrams, schematics, and examples can be implemented individually, collectively, by wide range of hardware, software, firmware, components or virtually any combination thereof. Designing the circuitry and writing the code for software and firmware would be well done within the skill of one ordinary skilled in the art and by means of details of this disclosure. Many of methods and components described herein may implement additional acts, may omit some acts, and may execute acts in a different order than specified, and this is simply recognizable by an ordinary skilled person in the art. For instance, the wearable reminder for drinking may not impalement a microcontroller and may be hardwired to provide some or all of the functionality disclosed herein.

Exemplary embodiments that are disclosed herein, are for clarity of understanding not limitation of the subject matter of this invention, and by way of example, a variety of adaptation, modification and changes are obvious to an ordinary skilled person in the art. Hence, the scope of the invention is limited solely by the appended claims.

The invention claimed is:

1. A wearable reminder system for drinking, comprising:
   an active RFID tag,
   the active RFID tag is a short-range RF transmitter and has an electric power storage and send RF signals in a predefined interval and the active RFID tag is attached to a drinkware; and
   a wearable device, the wearable device is a bracelet or a ring, the wearable device comprises
   an active RFID reader, the active RFID reader is an RF receiver which receive RF signals from the active RFID tag only when it is close enough to the active RFID tag,
   a microcontroller, the microcontroller is inside the wearable and controls the system,
   a means for alarm, the means for alarm is activated and deactivated by the microcontroller based on the active RFID detection signal from the active RFID reader,
   a means for movement detection, the means for movement detection is an accelerometer sensor, gyroscope sensor or an electronic compass sensor,
   the microcontroller, when the active RFID reader detects the active RFID tag, utilizes the means for movement detection to analyze a user hand movement and calculate how many times and how much the user drinks and compares drink amount to a predefined value, and reschedules and activates the alarm for next drink session based on predefined values.

2. A method for remind to drink, comprising:
   providing an active RFID tag, the active RFID tag is attached to a drinkware and the active RFID tag is a short-range RF transmitter and has an electric power storage and send RF signals in predefined interval;
   providing a wearable device, the wearable device is a bracelet or a finger ring;
   providing an active RFID reader inside the wearable device, the active RFID reader is an RF receiver which receive RF signals from the active RFID tag only when it is close enough to the active RFID tag;
   providing a microcontroller inside the wearable device to control the method;
   providing a means for alarm inside the wearable device, the means for alarm is activated and deactivated by the microcontroller based on active RFID detection signal from the active RFID reader;
   providing a movement detection sensor inside the wearable device, the sensor is an accelerometer sensor, a gyroscope sensor or an electronic compass;
   processing signals of the movement detection sensors to detect user hand movement when the active RFID reader detects presence of the active RFID tag;
   analyzing user hand movement to calculate how many times and how much the user drinks;
   comparing drink amount to a predefined value; and
   rescheduling and activating the alarm for next drink session based on predefined values.

* * * * *